US009656387B2

United States Patent
Mian

(10) Patent No.: US 9,656,387 B2
(45) Date of Patent: May 23, 2017

(54) HUMAN AUGMENTATION OF ROBOTIC WORK

(71) Applicant: International Electronic Machines Corporation, Troy, NY (US)

(72) Inventor: Zahid F. Mian, Loudonville, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 14/805,080

(22) Filed: Jul. 21, 2015

(65) Prior Publication Data

US 2015/0321350 A1  Nov. 12, 2015

Related U.S. Application Data

(63) Continuation of application No. 14/098,013, filed on Dec. 5, 2013, now Pat. No. 9,085,080.

(60) Provisional application No. 61/797,410, filed on Dec. 6, 2012.

(51) Int. Cl.
    *G05B 19/418*  (2006.01)
    *B25J 9/16*  (2006.01)

(52) U.S. Cl.
    CPC ............ *B25J 9/16* (2013.01); *B25J 9/161* (2013.01); *B25J 9/1689* (2013.01); *G05B 2219/39212* (2013.01); *G05B 2219/40153* (2013.01); *G05B 2219/40164* (2013.01); *G05B 2219/40399* (2013.01)

(58) Field of Classification Search
    CPC ................................. B25J 9/16; B25J 9/1689
    USPC ........................................ 700/245, 248, 250
    See application file for complete search history.

(56) References Cited

U.S. PATENT DOCUMENTS

| 6,047,472 | A | 4/2000 | Koch et al. | |
|---|---|---|---|---|
| 7,076,505 | B2 | 7/2006 | Campbell | |
| 7,152,347 | B2 * | 12/2006 | Herzog | E01B 27/02 37/105 |
| 7,302,319 | B2 * | 11/2007 | Wu | B61L 27/04 104/27 |
| 7,478,570 | B2 * | 1/2009 | Mian | B61K 9/12 73/865.9 |
| 7,525,667 | B2 * | 4/2009 | Mian | B61K 9/08 356/601 |

(Continued)

FOREIGN PATENT DOCUMENTS

| JP | 58-047672 | 3/1983 |
|---|---|---|
| JP | 2007-190659 | 8/2007 |
| JP | 2011-089262 | 5/2011 |

OTHER PUBLICATIONS

Lee, PCT Search Report for PCT Application No. US2013073357, Mar. 26, 2014, 12 pages.

(Continued)

*Primary Examiner* — Ian Jen
(74) *Attorney, Agent, or Firm* — LaBatt, LLC

(57) ABSTRACT

A solution for performing a set of tasks using one or more robotic devices is provided. The robotic device can be configured to perform each task using one or more effector devices, one or more sensor devices, and a hybrid control architecture including a plurality of dynamically changeable levels of autonomy. The levels of autonomy can include: full autonomy of the robotic device, teleoperation of the robotic device by a human user, and at least one level of shared control between the computer system and the human user.

20 Claims, 5 Drawing Sheets

(56) References Cited

U.S. PATENT DOCUMENTS

| | | | | |
|---|---|---|---|---|
| 7,536,278 B2* | 5/2009 | Mian | ..................... | G06Q 10/06 702/184 |
| 7,602,937 B2* | 10/2009 | Mian | ................... | G01N 21/538 382/100 |
| 7,635,245 B2* | 12/2009 | Kaneko | .................. | A47B 53/02 104/172.1 |
| 8,006,559 B2* | 8/2011 | Mian | ..................... | G01M 17/10 250/522.1 |
| 8,073,564 B2 | 12/2011 | Bruemmer et al. | | |
| 8,079,274 B2* | 12/2011 | Mian | ....................... | G01L 3/109 73/862.333 |
| 8,112,237 B2* | 2/2012 | Bartonek | ................. | B61L 1/08 702/66 |
| 8,140,250 B2* | 3/2012 | Mian | .................. | B61L 27/0094 104/26.1 |
| 8,150,105 B2* | 4/2012 | Mian | .................. | G06K 9/00214 382/104 |
| 8,166,727 B2* | 5/2012 | Pivac | ......................... | B25J 5/00 52/749.1 |
| 8,229,595 B2* | 7/2012 | Seelinger | ............... | B25J 9/1697 700/245 |
| 8,271,132 B2 | 9/2012 | Nielsen et al. | | |
| 8,335,606 B2* | 12/2012 | Mian | .................. | G01M 17/013 250/330 |
| 8,583,313 B2* | 11/2013 | Mian | .................... | G05D 1/0229 700/245 |
| 8,914,171 B2* | 12/2014 | Noffsinger | ................ | B61L 3/10 701/19 |
| 9,085,080 B2* | 7/2015 | Mian | | |
| 2003/0105566 A1* | 6/2003 | Miller | ................. | B60R 16/0232 701/34.3 |
| 2004/0008225 A1 | 1/2004 | Campbell | | |
| 2005/0251331 A1 | 11/2005 | Kreft | | |
| 2006/0074553 A1 | 4/2006 | Foo et al. | | |
| 2006/0131464 A1* | 6/2006 | Hesser | ..................... | B61K 9/06 246/169 D |
| 2006/0287815 A1 | 12/2006 | Gluck | | |
| 2007/0064244 A1* | 3/2007 | Mian | ..................... | G01B 11/25 356/601 |
| 2007/0163107 A1 | 7/2007 | Zhang et al. | | |
| 2007/0208841 A1* | 9/2007 | Barone | ............... | B61L 15/0027 709/223 |
| 2007/0233333 A1* | 10/2007 | Moffett | .................... | B61K 9/12 701/19 |
| 2007/0233695 A1 | 10/2007 | Boudreau et al. | | |
| 2007/0250212 A1 | 10/2007 | Halloran et al. | | |
| 2008/0149782 A1* | 6/2008 | Tiwari | ...................... | B61L 1/08 246/246 |
| 2008/0304065 A1* | 12/2008 | Hesser | .................... | E01B 35/00 356/400 |
| 2008/0306705 A1* | 12/2008 | Luo | ......................... | B61K 9/04 702/134 |
| 2009/0234499 A1 | 9/2009 | Nielsen et al. | | |
| 2010/0217437 A1 | 8/2010 | Sarh et al. | | |
| 2012/0215380 A1 | 8/2012 | Fouillade et al. | | |
| 2013/0071573 A1 | 3/2013 | Brewer et al. | | |
| 2014/0163730 A1* | 6/2014 | Mian | ......................... | B25J 9/16 700/248 |

OTHER PUBLICATIONS

Mingjen, J., U.S. Appl. No. 14/098,013, Notice of Allowance, Mar. 18, 2015, 14 pages.

Prokopious, P., Application No. EP 13 86 0111, Supplementary European Search Report, Jun. 29, 2016, 10 pages.

Guglielmelli, E., et al., "A Supervisory System for the URMAD Robotic Unit," Proceedings of the International Conference on Intelligent Robots and Systems, Sep. 12, 1994, 8 pages, vol. 3.

Rogers, E., et al., "Cooperative Assistance for Remote Robot Supervision," Intelligent Systems for the 21st Century, Oct. 22, 1995, 6 pages, vol. 5.

Sellner, B., et al., "Coordinated Multiagent Teams and Sliding Autonomy for Large-Scale Assembly," Proceedings of the IEEE, Jul. 1, 2006, 20 pages, vol. 94, No. 7.

* cited by examiner

HUMAN AUGMENTATION OF ROBOTIC WORK

REFERENCE TO RELATED APPLICATIONS

The current application is a continuation of U.S. patent application Ser. No. 14/098,013, which was filed on 5 Dec. 2013, and which claims the benefit of U.S. Provisional Application No. 61/797,410, which was filed on 6 Dec. 2012, both of which are hereby incorporated by reference.

TECHNICAL FIELD

The disclosure relates generally to robotic activities, and more particularly, to human augmentation of robotic work.

BACKGROUND ART

Robots have been developed for multiple purposes over the last few decades. The most successful robotic applications are fixed-base units, which are programmed to perform single, clearly delineated, relatively simple tasks (such as welding a particular portion of a car body in an assembly line). Recently, some mobile robots have seen commercial success, such as the Roomba—an automated vacuum cleaner suitable for household cleaning.

However, a number of other applications that could potentially make use of robotic devices or unmanned vehicles require operation in much more demanding settings. For example, the military is using a number of unmanned vehicles on land, sea, or in the air. Other industries, such as the railroad industry, also have a number of tasks which are commonly performed and potentially simple enough to expect a machine to be able to achieve routinely. A significant challenge to developing fully automated machines for these settings is that simple tasks often can present difficulties. However, the setting may require achieving perfection or near perfection, e.g., these tasks may need to be performed effectively one hundred percent of the time (e.g., one failure out of millions of operations).

In many current-art approaches, robots are capable of recognizing gross failures or situations in which the robot simply does not recognize any key elements of its environment. At that point, the robot requires a human being to completely take over. Additionally, the robot may have caused other problems (e.g., a railroad robotic vehicle, having gotten badly turned around, could cross over an active track and be hit by or even cause a derailment of moving rail vehicles). Because of this, current robotic systems are either completely remote-controlled, or controlled by relatively "fragile" autonomy, which is cut off whenever the robot encounters a situation that does not meet its operational parameters.

Previous approaches have sought to improve one or more aspects of robotic operation and interaction between robotic devices and users. One approach proposes a multi-robot control interface, which allows a user to control multiple robotic devices using a single user interface. Another approach seeks to provide power saving features in a robot via a peripheral device including a controller having an active mode and a hibernation mode. Still another approach seeks to use a graphical interface and a control intermediary to analyze and determine a task-oriented autonomy level for a robot.

SUMMARY OF THE INVENTION

In view of the prior art, the inventors have identified various challenges and limitations of current approaches for implementing production-worthy robotics-based manufacturing and maintenance work. For example, the inventors have noted that current approaches do not provide capabilities for a robotic device to determine when to request assistance from a human user. Additionally, current approaches do not establish a methodology for training a robotic device with a set of skills required to diminish cognitive load on the human user. Furthermore, current approaches do not allow the robotic device to shift seamlessly between levels of autonomy. These deficiencies reduce the efficiency and adversely affect productivity of current robotic devices.

Embodiments provide a solution including improved human-robot interaction, and particularly human augmentation of robotic work. For example, an embodiment can improve aspects of cooperation between a human user and a robotic device. In an illustrative embodiment, an autonomous robotic device can determine when to seek assistance of a human user to perform a task. Furthermore, an embodiment provides a robotic device capable of reducing a cognitive load on a human advisor while performing a set of tasks.

Aspects of the invention provide a solution for performing a set of tasks using one or more robotic devices. The robotic device can be configured to perform each task using one or more effector devices, one or more sensor devices, and a hybrid control architecture including a plurality of dynamically changeable levels of autonomy. The levels of autonomy can include: full autonomy of the robotic device, teleoperation of the robotic device by a human user, and at least one level of shared control between the computer system and the human user.

A first aspect of the invention provides a mobile robotic device comprising: a set of effector devices; a set of sensor devices; and a computer system including at least one computing device, wherein the computer system implements a machine cognition engine configured to perform a set of railroad maintenance tasks using the set of effector devices, the set of sensor devices, and a hybrid control architecture including a plurality of dynamically changeable levels of autonomy, wherein the plurality of levels of autonomy include: full autonomy of the robotic device, teleoperation of the robotic device by a human user, and at least one level of shared control between the computer system and the human user.

A second aspect of the invention provides a method of performing a task using a robotic device, the method comprising: the robotic device initially attempting to complete an action of the task using a full autonomy level of autonomy; in response to the robotic device encountering a problem completing the action using the full autonomy level of autonomy, the robotic device: determining a criticality of the action; adjusting a level of autonomy in response to the action being a critical action, wherein the adjusted level of autonomy includes at least some human assistance for the robotic device; and bypassing the action in response to the action being a non-critical action.

A third aspect of the invention provides a system comprising: a robotic device including: a set of effector devices; a set of sensor devices; and a first computer system including at least one computing device, wherein the first computer system implements a machine cognition engine configured to perform a task using the set of effector devices, the set of sensor devices, and a hybrid control architecture including a plurality of dynamically changeable levels of autonomy, wherein the plurality of levels of autonomy include: full autonomy of the robotic device, teleoperation of the robotic device by a human user, and at least one level of shared control between the computer system and the human user.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
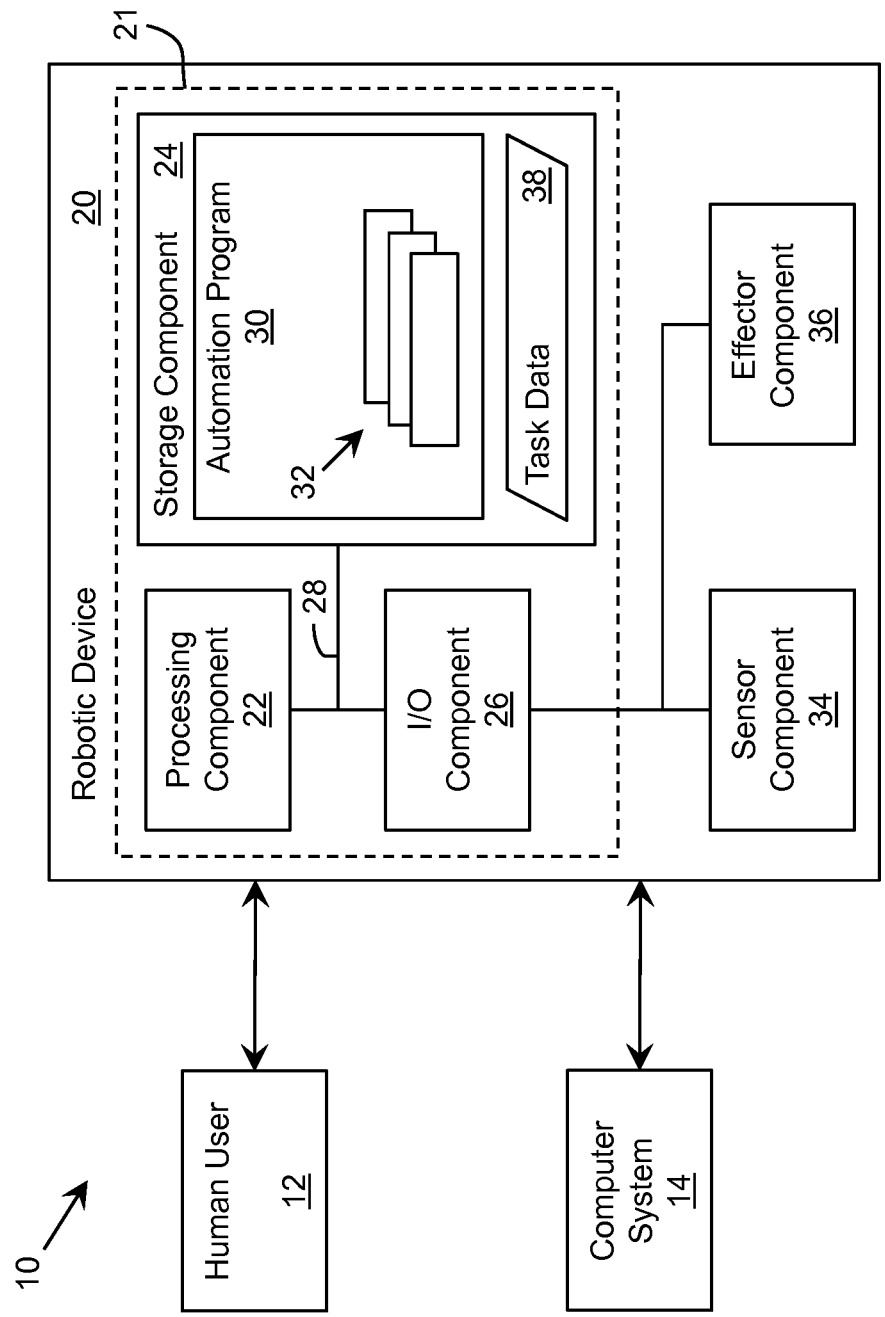
FIG. 1 shows an illustrative environment for performing a task using a robotic device according to an embodiment.

As indicated above, aspects of the invention provide a solution for performing a set of tasks using one or more robotic devices. The robotic device can be configured to perform each task using one or more effector devices, one or more sensor devices, and a hybrid control architecture including a plurality of dynamically changeable levels of autonomy. The levels of autonomy can include: full autonomy of the robotic device, teleoperation of the robotic device by a human user, and at least one level of shared control between the computer system and the human user. As used herein, unless otherwise noted, the term "set" means one or more (i.e., at least one) and the phrase "any solution" means any now known or later developed solution. Furthermore, a "task" means a set of atomic actions performed to accomplish a goal. The goal can be any type of objective suitable for being performed using a robotic device, e.g., inspection of one or more objects, manipulation/relocation of one or more objects, assembly/disassembly of objects, and/or the like.

Aspects of the invention seek to achieve an improved efficiency with which a robotic device can be utilized to perform a task. The inventors recognize various limitations in current robotic decision-making and operation approaches. For example, no current-art systems exist which allow robotic devices to track their task progression in a manner that allows the need and scope for human intervention to be properly evaluated and prioritized. The inventors recognize that in order to perform many tasks in a shop or field environment at close to one hundred percent efficiency, human intervention may be required when the robotic device cannot complete the task on its own. However, such human intervention can make the robotic system less effective at reducing the cognitive load of the human user. To this extent, the inventors propose a solution in which: the human user is asked only to assist on certain actions in the task; the robotic device learns from such assistance; the robotic device provides assistance to the human; and/or the robotic device affirmatively re-takes control from the human user.

An embodiment provides a robotic device, which combines autonomous task completion with diagnostic interaction while reducing a need for human interaction and increasing a completion rate for the tasks. In an embodiment, the robotic device and human can operate as effective partners, in which the human provides assistance unique to human capabilities while allowing the robotic device to both perform operations and make judgments, which are better performed by robotic means. Illustrative features of the invention show and describe attributes of collaboration between humans and robotic devices specifically in conjunction with human intervention triggers, anomaly detection algorithms, and alert systems. However, it is understood that the invention can be applied to other attributes of collaboration between humans and robotic devices.

Turning to the drawings, FIG. 1 shows an illustrative environment 10 for performing a task using a robotic device 20 according to an embodiment. To this extent, the environment 10 includes a human user 12 and a robotic device 20 that can perform a process described herein in order to complete the task. In particular, the human user 12 can augment operation of the robotic device 20 in performing the task by, for example, assisting the robotic device 20 in completing one or more actions as part of the task. In this manner, the human user 12 and robotic device 20 can cooperate to achieve a higher completion rate for the task than that provided by prior art solutions.

In general, the robotic device 20 includes a computer system 21, which is configured to operate various components of the robotic device 20 in order to perform a task within its environment. The computer system 21 can include one or more computing devices. For example, the computer system 21 is shown including a processing component 22 (e.g., one or more processors), a storage component 24 (e.g., a storage hierarchy), an input/output (I/O) component 26 (e.g., one or more I/O interfaces and/or devices), and a communications pathway 28. In this case, the computer system 21 can include an automation program 30, which makes the robotic device 20 operable to perform one or more tasks by performing a process described herein.

In the illustrative embodiment of a computer system 21, the processing component 22 executes program code, such as the automation program 30, which is at least partially fixed in the storage component 24. While executing the program code, the processing component 22 can process data, such as task data 38, which can result in reading and/or writing transformed data from/to the storage component 24 and/or the I/O component 26 for further processing. The pathway 28 provides a communications link between each of the components in the computer system 21. The I/O component 26 can comprise one or more human I/O devices, which enable a human user 12 to directly interact with the robotic device 20 and/or one or more communications devices to enable another computer system 14 to communicate with the robotic device 20 using any type of communications link. In the latter case, the human user 12 can interact with the robotic device 20 via the computer system 14. Regardless, the automation program 30 can manage a set of interfaces (e.g., graphical user interface(s), application program interface, and/or the like) that enable human users 12 and/or other computer systems 14 to interact with the automation program 30. Furthermore, the automation program 30 can manage (e.g., store, retrieve, create, manipulate, organize, present, etc.) the data, such as task data 38, using any solution.

In an embodiment, the robotic device 20 includes a computer system 21 formed of one or more general purpose computing articles of manufacture (e.g., computing devices) capable of executing program code, such as the automation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the automation program 30 can be embodied as any combination of system software and/or application software.

Furthermore, the automation program 30 can be implemented using a set of modules 32. In this case, a module 32 can enable the robotic device 20 to perform a set of tasks used by the automation program 30, and can be separately developed and/or implemented apart from other portions of the automation program 30. As used herein, the term "component" means any configuration of hardware, with or without software, which implements the functionality described in conjunction therewith using any solution, while the term "module" means program code that enables a computer system 21 to implement the actions described in conjunction therewith using any solution. When fixed in a storage component 24 of a computer system 21 that includes a processing component 22, a module 32 is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 21.

When the computer system 21 comprises multiple computing devices, each computing device can have only a portion of the automation program 30 fixed thereon (e.g., one or more modules 32). However, it is understood that the computer system 21 and the automation program 30 are only representative of various possible equivalent computer systems that may perform a process described herein. To this extent, in other embodiments, the functionality provided by the computer system 21 and the automation program 30 can be at least partially implemented by one or more computing devices that include any combination of general and/or specific purpose hardware with or without program code. In each embodiment, the hardware and program code, if included, can be created using standard engineering and programming techniques, respectively.

While the computer system 21 is shown implemented entirely on the robotic device 20, it is understood that the computer system 21 can include one or more computing devices physically located apart from the robotic device 20. Regardless, when the computer system 21 includes multiple computing devices, the computing devices can communicate over any type of communications link. Furthermore, while performing a process described herein, the computer system 21 can communicate with one or more other computer systems 14 using any type of communications link. In either case, the communications link can comprise any combination of various types of optical fiber, wired, and/or wireless links; comprise any combination of one or more types of networks; and/or utilize any combination of various types of transmission techniques and protocols. Illustrative computer systems 21 include: a laptop computer located (e.g., mounted) within the robotic device 20, a rack-mounted computing device, an embedded computing device, and/or the like. Furthermore, a computer system 21 can include any combination of multiple computing devices, such as a rack-mounted computing device for controlling navigation and one or more embedded computing devices located in an arm for implementing finer dedicated control of a manipulator.

As discussed herein, the robotic device 20 can be configured to perform a set of tasks in a fully automated manner and/or in a manner augmented by a human user 12. To this extent, the robotic device 20 is shown including a sensor component 34 and an effector component 36, each of which is in communication with the computer system 21, e.g., via the I/O component 26. The computer system 21 provides the robotic device 20 with a capability for machine cognition. It is understood that the robotic device 20 can be of any type of fixed location and/or mobile device capable of operating in any environment, including on land, in water, in air, in space, and/or the like.

In general, the sensor component 34 includes one or more sensor devices which enable the robotic device 20 to receive data corresponding to one or more attributes of the robotic device 20 and/or its operating environment. Illustrative sensor devices include an imaging device (e.g., visible light, infrared, still, video, and/or the like), a rangefinder (laser, acoustic, etc.), radar, a microphone, a positioning device (e.g., a global positioning system (GPS) device), an inertial measurement device, a chemical sensor, an impact or vibration sensor, and/or the like. The effector component 36 includes one or more devices which enable the robotic device 20 to perform an action. Illustrative effector devices include an engine, a transmission, a set of wheels/tracks, an arm, a gripper, a radio frequency identification (RFID) reader, a vacuum attachment, a blower attachment, armament, and/or the like. It is understood that the particular combination of devices included in the sensor component 34 and effector component 36 can vary widely depending on the particular application (e.g., set of tasks expected to be performed by the robotic device 20), attributes of the robotic device 20 (e.g., whether it is stationary or mobile), and the operating environment. An appropriate combination of devices for the sensor component 34 and the effector component 36 can be selected and implemented using any solution.

In an embodiment, the computer system 21 enables the robotic device 20 to operate using a hybrid control architecture, which permits dynamic switching between various modes of operation in order to perform a task and/or an action. These modes of operation can include: teleoperation of the robotic device 20 where the human user 12 manually controls the robotic device 20; assisted control where manual control is combined with an ability of the robotic device 20 to cause the human user 12 to surrender control at need; and full autonomic operation by the robotic device 20.

Figure 2:
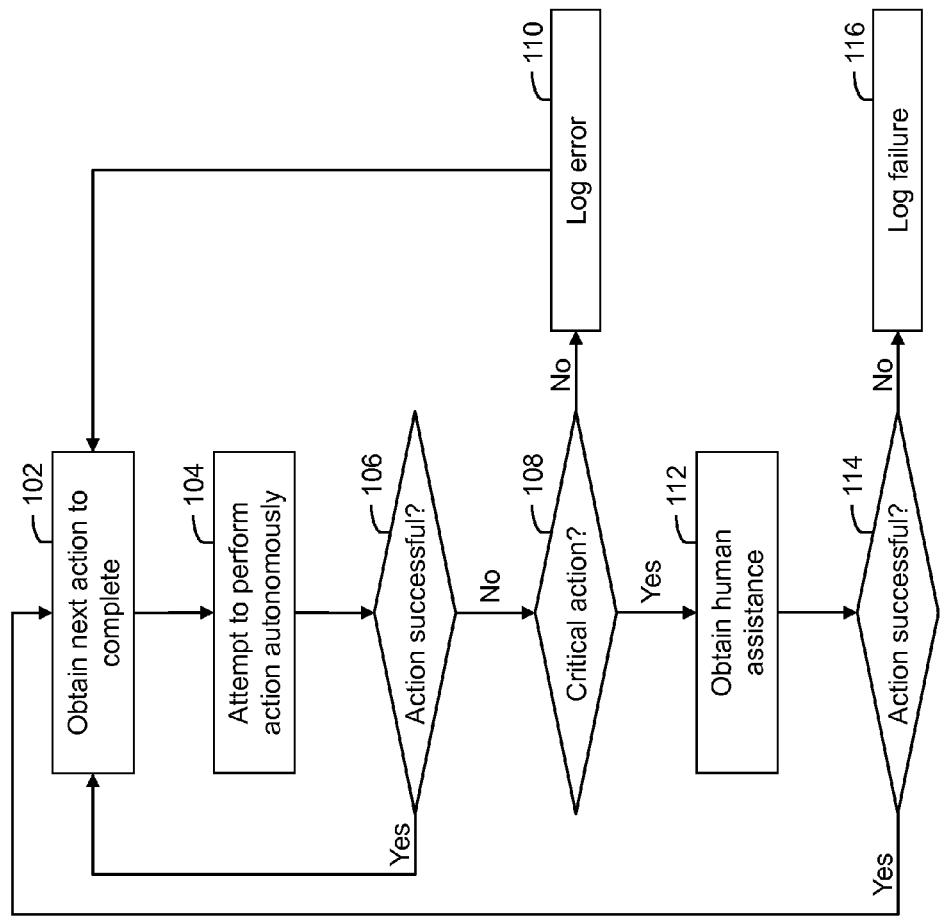
FIG. 2 shows an illustrative process for performing a task using a robotic device according to an embodiment.

FIG. 2 shows an illustrative process for performing a task using a robotic device, which can be implemented using the environment 10 (FIG. 1), according to an embodiment. Referring to FIGS. 1 and 2, in action 102, the computer system 21 can obtain the next action to complete as part of the task using any solution. For example, the computer system 21 can store a series of actions as task data 38 for the task. Furthermore, the computer system 21 can automatically determine the next action, e.g., using machine cognition, based on the environment and the goal for the task. Still further, the human user 12 or computer system 14 can provide the next action for processing by the computer system 21.

In action 104, the robotic device 20 attempts to perform the action autonomously. In particular, the computer system 21 can receive data from the sensor component 34, process the data, and generate instructions to be implemented by the effector component 36 in order to perform the action. In action 106, the computer system 21 can determine whether the robotic device 20 was able to successfully complete the action. If so, the process returns to action 102 where the computer system 21 obtains the next action for the task.

When the robotic device 20 cannot complete the action, in action 108, the computer system 21 can determine whether the action is a critical action for completing the task using any solution. For example, the computer system 21 can determine whether the robotic device 20 can perform an alternative action, whether subsequent actions require completion of the action, and/or the like. When the computer system 21 determines that the action is not a critical action, in action 110, the computer system 21 can store data corresponding to the error (e.g., as task data 38), and return to action 102 to obtain the next action.

When the computer system 21 determines that the unsuccessful action is a critical action, in action 112, the computer system 21 can obtain assistance from the human user 12 using any solution. For example, the computer system 21 can transmit a message to a computer system 14 being utilized by the human user 12, which can provide a notification for presentation to the user 12. In response, the human user 12 can take over complete or partial control of the robotic device 20, provide information to enable the robotic device 20 to continue to perform the action independently (e.g., identify an item in a region of interest), indicate that the action cannot be performed, and/or the like. When the human user 12 takes partial or complete control of the robotic device 20, the human user 12 can teleoperate one or more components of the robotic device 20 using any solution. For example, the human user 12 can utilize a computer system 14 to transmit instructions for processing by the computer system 21 for the robotic device 20. In response, the computer system 21 can process the commands to move one or more devices in the effector component 36 and/or sensor component 34 according to the instructions to perform the action. During teleoperation by the human user 12, the computer system 21 can monitor the actions performed by the human user 12 to: learn how to address a similar situation in the future; preempt actions that will result in an unsafe condition; identify a point at which the human user 12 has provided sufficient assistance to allow the computer system 21 to retake control of the robotic device 20; and/or the like.

In action 114, the computer system 21 can determine whether the action was successfully performed with the human assistance using any solution. For example, the human user 12 can notify the computer system 21 that the action is complete, the computer system 21 can automatically determine that the action was completed by monitoring the human user's 12 actions, and/or the like. If the action was successful, the process can return to action 102, to obtain the next action to complete for the task. If not, in action 116, the computer system 21 can store data corresponding to the error (e.g., as task data 38). When the task has been successfully completed or a critical action was unable to be completed, the computer system 21 can proceed to the next task or wait to receive instructions for a next task. In the event the robotic device 20 has no subsequent task to perform immediately, the computer system 21 can ensure that any devices in the sensor component 34 and effector component 36 are stored safely, shut down or partially shut down various devices, relocate to a safe location, and/or the like.

Figure 3:
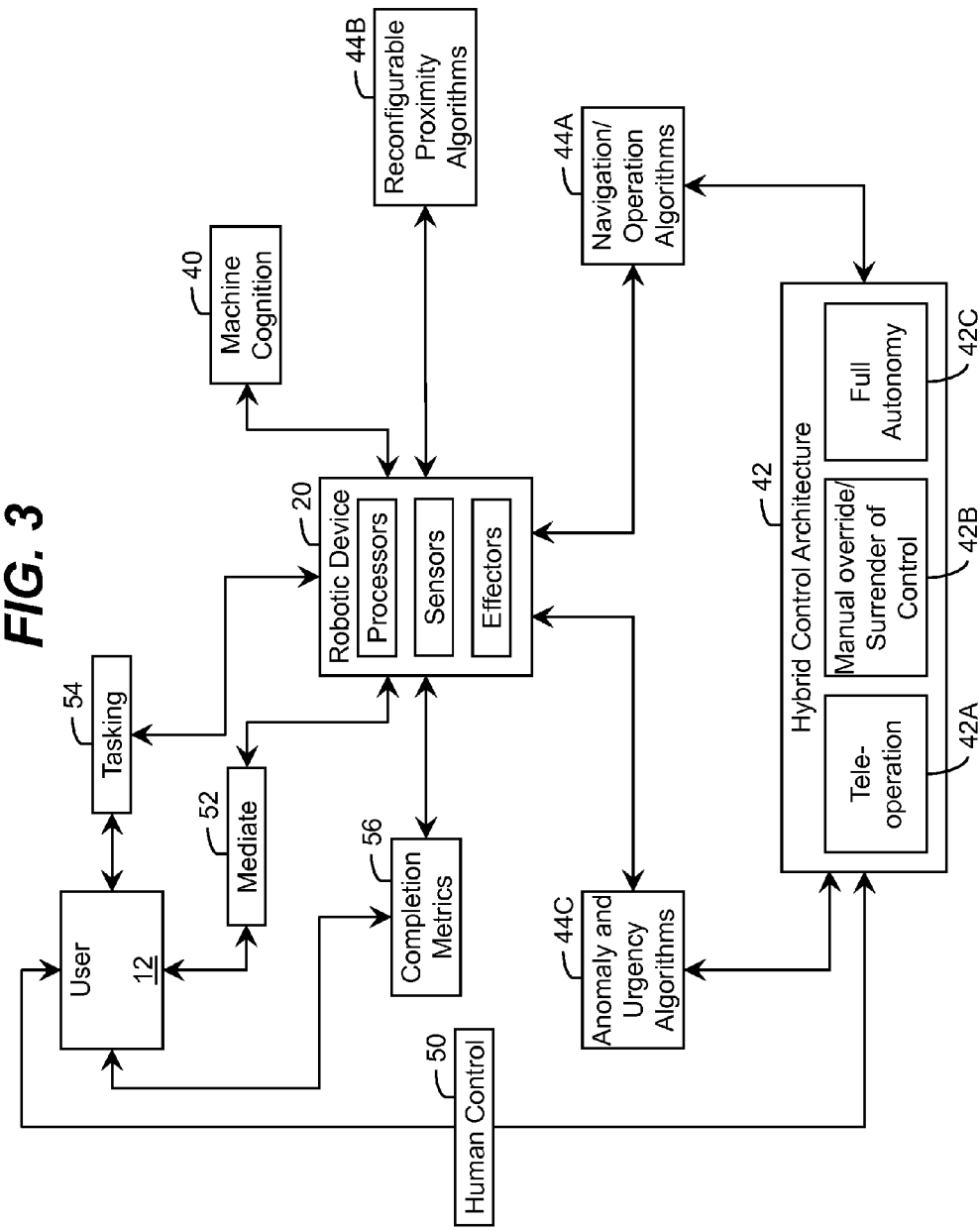
FIG. 3 shows illustrative principles relating to human augmentation of robotic work according to an embodiment.

FIG. 3 shows illustrative principles relating to human augmentation of robotic work according to an embodiment. As illustrated, the robotic device 20 includes various sensors, effectors, and processors, which collectively enable the robotic device 20 to perform various tasks. Operation of the robotic device 20 is controlled by a machine cognition engine 40 (e.g., implemented by the processor(s) and program code) using a hybrid control architecture 42, which includes various levels of autonomy. To this extent, the hybrid control architecture 42 permits dynamic changes between various modes of operation, one or more of which includes some amount of human control 50, for the robotic device 20 during performance of a task. Illustrative modes of operation can include: teleoperation 42A by the human user 12, in which the robotic device 20 is being operated by the human user 12; assisted control 42B, which combines manual control with an ability of the robotic device 20 to cause the human user 12 to surrender control; and full autonomy 42C, in which the robotic device 20 is operating without assistance from the human user 12. Actions performed by the robotic device 20 under any of the modes of operation can be controlled and directed by the interaction of various algorithms 44A-44C. Illustrative algorithms include navigation and basic operation algorithms 44A, reconfigurable proximity algorithms 44B, anomaly/urgency evaluation algorithms 44C, and/or the like.

In addition to controlling operation of the robotic device 20, the human user 12 can mediate 52 the actions of the robotic device 20, e.g., by changing or otherwise affecting operation of one or more of the algorithms 44A-44C. Such changes can be implemented through updating the algorithms 44A-44C directly (e.g., updating software used to implement the algorithms), training the robotic device 20 to perform various tasks using any solution, identifying a particular situation or element of a situation which may require intervention by the human user 12 and/or the robotic device 20 under the hybrid architecture 42, and/or the like.

The human user 12 also can assign tasks to be performed by the robotic device 20 using a tasking methodology 54. The tasking methodology 54 can be implemented using any solution. For example, the tasking methodology can comprise a simple graphical user interface, which enables the human user 12 to select from a menu of tasks for which the robotic device 20 is capable of performing. The tasking methodology 54 also can be implemented using a more complex solution, such as describing through an interface a complex series of actions to be performed by the robotic device 20. Additionally, an embodiment of the tasking methodology 54 enables the robotic device 20 to add/propose tasks, e.g., based on one or more aspects of the operating environment. For example, the robotic device 20 may identify debris in an unsafe location (e.g., an obstruction on a track) and request permission from the human user 12 to perform the task prior to completing a previously assigned task.

Each of the algorithms 44A-44C can cause the robotic device 20 to continually check for completion of an assigned task or its corresponding action(s) using a cyclic process. Additionally, the robotic device 20 can monitor the performance of assigned task(s) using a set of completion metrics 56. If a task is not completed, the algorithm 44A-44C can cause the robotic device 20 to evaluate whether a difficulty in completing the task has been encountered. If so, the robotic device 20 can evaluate whether the amount of autonomy should be changed (e.g., whether human assistance is required), whether the robotic device 20 can complete the task using an alternative approach, whether the problem (and possible incompletion of the action) can be noted and performance of the task continue without human assistance, and/or the like. In the event the robotic device 20 determines that human assistance is required, the robotic device 20 can notify the human user 12 and adjust the current operating state 42A-42C in the hybrid control architecture 42.

In an embodiment, while the human user 12 is performing some level of control, the robotic device 20 can monitor progress of the action to learn how to subsequently perform the action autonomously based on the human user's 12 actions. Furthermore, the robotic device 20 can automatically identify when the human user 12 has performed sufficient acts to enable the robotic device 20 to continue with the task without further human assistance. Subsequently, the robotic device 20 can adjust the current operating state 42A-42C in the hybrid control architecture 42 and commence autonomous operations. Similarly, the human user 12 can monitor progress being made by the robotic device 20 using the set of completion metrics 56 and interrupt the operations of the robotic device 20 in response to determining that the robotic device 20 requires assistance. In response, the robotic device 20 can adjust the current operating state 42A-42C in the hybrid control architecture 42 to allow the human user 12 to perform the action(s). The human user 12 can manually perform the action(s) and can return control to the robotic device 20 once the action(s) have been completed. In this manner, both the robotic device 20 and the human user 12 can evaluate information regarding the current and desired states of task(s) being performed by the robotic device 20 to dynamically determine actions for both parties.

Additional aspects of the invention are described herein in conjunction with a ground-based robotic device 20 configured for use in a railroad setting, such as a railroad maintenance yard. To this extent, the robotic device 20 can be configured to perform one or more railroad maintenance operations. For example, the robotic device 20 can be configured to perform a brake bleeding task on a series of rail vehicles in a consist, such as a freight train. Brake bleeding is an important service performed in rail yards, for which it is highly desirable to successfully perform the task as close to one hundred percent of the time as possible. In particular, leaving a rail vehicle's brakes on can cause rail vehicles to fail to couple, requiring additional work to force the couplings. Additionally, if left on during travel, the brakes can cause damage to the wheel and/or brakes, drastically reduce an efficiency of the train, and/or the like.

Figure 4:
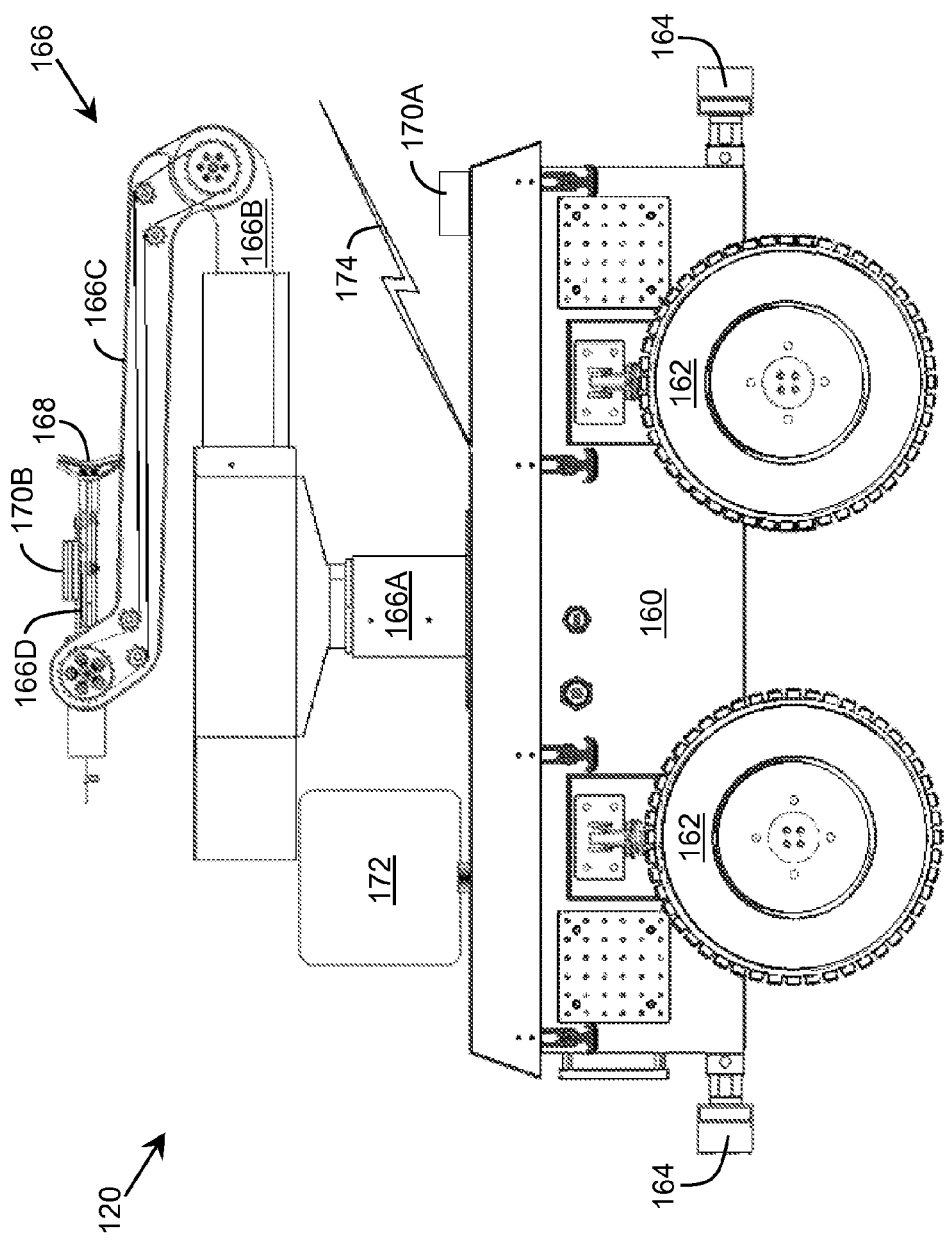
FIG. 4 shows an illustrative rail yard robotic device according to an embodiment.

FIG. 4 shows an illustrative rail yard robotic device 120 according to an embodiment. The robotic device 120 is shown including a box-shaped main body 160 to which are attached driving wheels 162 and impact-sensitive protective bumpers 164. The robotic device 120 further includes a mechanical arm 166, which can have several degrees of freedom. For example, the mechanical arm 166 can be mounted to the main body 160 using a swivel mount 166A and include one or more extendible sections and arm gearing 166B-166D. An effector device, such as a grasping manipulator 168, can be located on an end of the mechanical arm 166. The grasping manipulator 168 can be configured to grasp and pull brake rods on rail vehicles.

To permit navigation of the robotic device 120 and performance of a set of maintenance operations, including brake bleeding, the robotic device 120 further includes a combined camera and laser rangefinder device 170A located on the main body 160, and a second combined camera and laser rangefinder device 170B located on a section 166D of the arm 166. Furthermore, the robotic device 120 can include one or more devices for transmitting and/or acquiring data using a wireless solution. For example, the robotic device 120 can include an RFID (e.g., AEI) tag reader 172, which can be configured to acquire identifying data for the rail vehicles on which the robotic device 120 operates. Furthermore, the robotic device 120 can include one or more computing devices of a computer system 21 (FIG. 1), a GPS device for use in tracking the location of the robotic device 120, and/or the like, mounted inside the main body 160, each of which can acquire and/or transmit data from/to an external computer system 14 (FIG. 1) using a corresponding wireless communication solution 174. In a more particular illustrative embodiment, the computing device comprises a rack-mounted computing device executing a Unix-based operating system and custom software, which is configured to communicate with a local or remote human user 12 (FIG. 1), operate the various input/output devices described in conjunction with the robotic device 120, and provide machine cognition as described herein.

Figure 5:
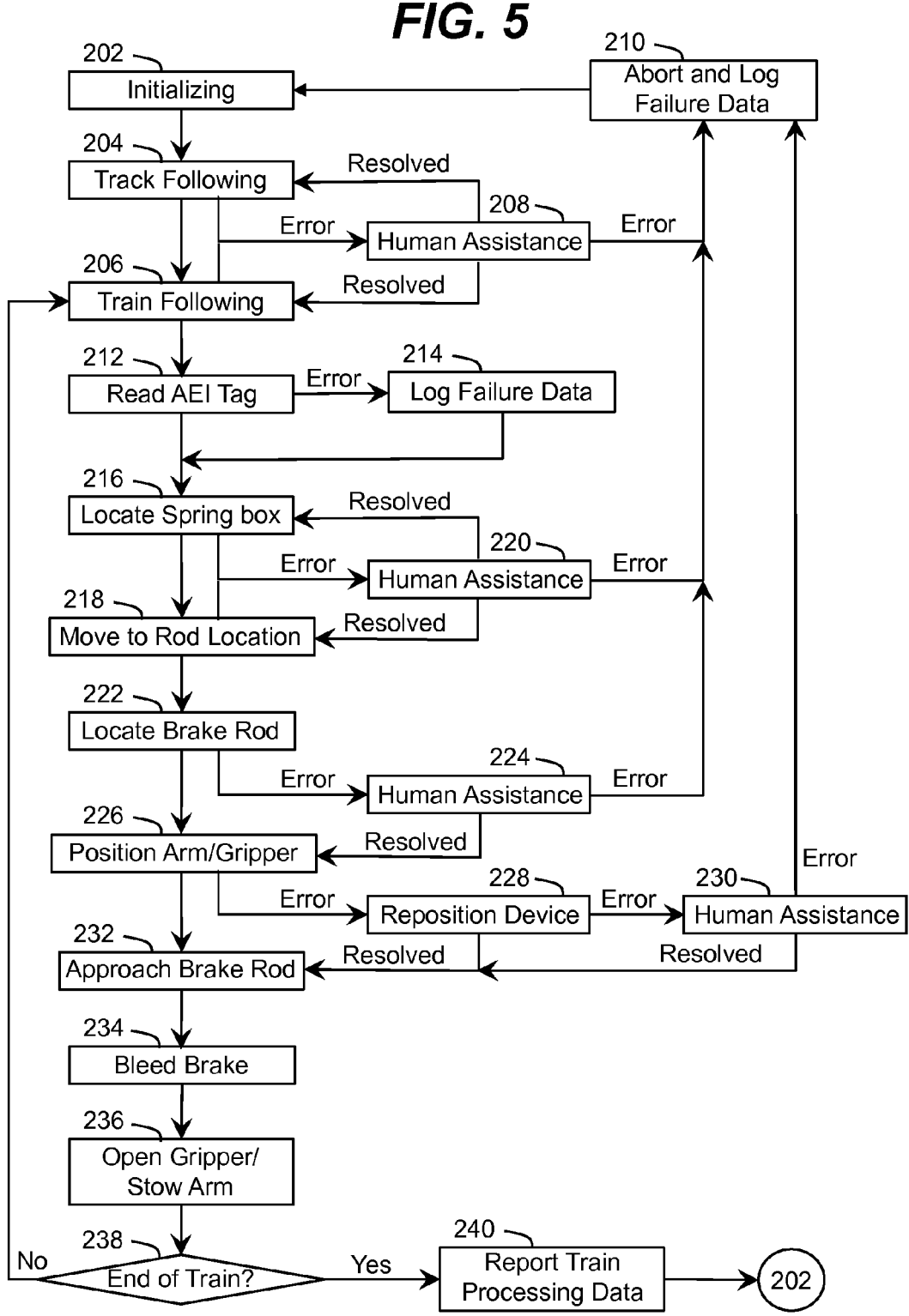
FIG. 5 shows an illustrative process for bleeding brakes on a train using a rail yard robotic device according to an embodiment.

FIG. 5 shows an illustrative process for bleeding brakes on a train using a rail yard robotic device, such as the rail yard robotic device 120 (FIG. 4), according to an embodiment. Referring to FIGS. 4 and 5, in action 202, the robotic device 120 can initialize the various components of the robotic device 120 for bleeding brakes on a train. The initialization can include any combination of various actions, which can be dependent on a previous state of the robotic device 120, the components of the robotic device 120, and/or the like. Illustrative actions can include restarting the robotic device 120 from a previous shut down, clearing any work previously performed by the robotic device 120, determining a next task to perform after a process was aborted due to a failure, and/or the like. Furthermore, the initialization can include the robotic device 120 receiving information relating to the assigned task, such as a map of the rail yard in which the robotic device 120 will be operating, identification of a particular track and train on which to perform the brake bleeding operation, a location of markers, such as spring boxes, on the target rail vehicles, and/or the like.

In action 204, the robotic device 120 can follow a target track until reaching the designated train. After reaching the designated train, in action 206, the robotic device 120 commenced following the train. If the robotic device 120 encounters a problem in action 204 or 206, in action 208, the robotic device 120 can obtain human assistance. For example, the robotic device 120 may not be able to navigate an obstacle, may lose tracks buried in snow, and/or the like. In action 208, a human user 12 (FIG. 1) will operate the robotic device 120 in an attempt to resolve the problem. When the problem is successfully resolved by the human user 12, the robotic device 120 can resume independent operation and return to the corresponding action 204 or 206. When the human user 12 cannot successfully resolve the error, in action 210, the robotic device 120 can abort the task, record data corresponding to the failure, and return to action 202 to wait to receive another task. In this case, the robotic device 120 can stow any movable attachments, shut down/partially shut down unnecessary components, move to a safe location, and/or the like.

While following a train, the robotic device 120 can read an AEI tag of an adjacent rail vehicle using the AEI tag reader 172. The AEI tag can be used to identify the corresponding rail vehicle for possible future reference and/or identify a rail vehicle/rail vehicle type, which may require special processing. Regardless, in an embodiment, the AEI tag data has a low priority. As a result, when the robotic device 120 fails to read the AEI tag, in action 214, the robotic device 120 can store data corresponding to the failure (e.g., relative position of the rail vehicle in the train), identify the rail vehicle using an alternative identification solution, and return to the brake bleeding process. In this manner, the robotic device 120 does not interrupt the human user 12 by requesting assistance in response to the failure. Rather, the robotic device 120 can store the relevant information for later use.

In action 216, the robotic device 120 can locate a marker, such as a spring box, on a rail vehicle. The spring box can provide a good navigation landmark on a rail vehicle due to a standardized design of spring boxes for various types of rail vehicles. However, it is understood that a spring box is only illustrative of various possible markers. Regardless, in action 218, the robotic device 120 can use the spring box location and other navigation data to move to a likely location of the brake rod on the rail vehicle. When the robotic device 120 encounters a problem in action 216 or 218, in action 220, the robotic device 120 can obtain assistance from the human user 12. For example, the robotic device 120 may fail to locate a spring box, identify an extra spring box on a rail vehicle, be unable to navigate to the likely location of the brake rod, and/or the like. In action 220, the human user 12 can control the robotic device 120 to address the error and/or provide data for use by the robotic device 120 to enable the robotic device 120 to independently address the error. For example, the human user 12 may identify the spring box, indicate that an object is not a spring box, identify the likely location of the brake rod without using the marker, navigate an obstacle, and/or the like. In response, the robotic device 120 can use the information provided by the human user 12 to train itself to address a similar situation in the future (e.g., more accurately identify spring boxes). In the event the human user 12 cannot resolve the error, in action 210, the robotic device 120 can abort the task, record data corresponding to the failure, and return to action 202 to wait to receive another task.

Once the robotic device has moved to a likely location for the brake rod, in action 222, the robotic device 120 can locate the brake rod on the rail vehicle. For example, the robotic device 120 can use machine vision processes to process data received from the onboard camera and laser rangefinder devices 170A, 170B to locate the brake rod. When the robotic device 120 is unable to locate the brake rod in the expected location, in action 224, the robotic device 120 can obtain assistance from the human user 12. The human user 12 can identify the brake rod in image data acquired by the camera and laser rangefinder devices 170A, 170B, change a field of view of one or both of the devices 170A, 170B, and/or the like. When the human user 12 resolves the error, the robotic device 120 can continue with the automated brake bleeding process. Additionally, the robotic device 120 can use data corresponding to the human user's 12 resolution of the error to learn from the human user 12 for future attempts at automatically identifying a brake rod. Furthermore, the robotic device 120 can restart the automated process in response to one or more actions taken by the human user 12. For example, after changing the field of view of a device 170A, 170B, the robotic device 120 may identify the brake rod within the new field of view and continue with the brake bleeding operation. In the event the human user 12 cannot resolve the error, in action 210, the robotic device 120 can abort the task, record data corresponding to the failure, and return to action 202 to wait to receive another task.

After locating the brake rod, in action 226, the robotic device 120 can position the arm 166 and grasping manipulator 168 to enable the grasping manipulator 168 to properly approach the brake rod for grasping. When attempting to position the arm 166, the robotic device 120 may encounter one or more problems. For example, the robotic device 120 may recognize that the current position and/or angle of the main body 160 are not optimal for grasping the brake rod. In this case, in action 228, the robotic device 120 can reposition itself to a location anticipated to provide a better grasping configuration. If the robotic device 120 remains unable to grasp the brake rod, in action 230, the robotic device 120 can obtain assistance from the human user 12. The human user 12 can adjust the location of the main body 160, operate the arm 166, and/or the like, to properly locate the grasping manipulator 168. While the human user 12 has control, the robotic device 120 can learn from the human's actions how to address a similar problem in the future. When the human user 12 resolves the error, the robotic device 120 can continue with the automated brake bleeding process. In the event the human user 12 cannot resolve the error, in action 210, the robotic device 120 can abort the task, record data corresponding to the failure, and return to action 202 to wait to receive another task.

Once the arm 166 and grasping manipulator 168 have been properly positioned, in action 232, the robotic device 120 can operate the grasping manipulator 168 to approach the brake rod. In action 234, the robotic device 120 can operate the grasping manipulator 168 to grip and bleed the brake. Once bleeding is complete, in action 236, the robotic device 120 can open the grasping manipulator 168 to release the brake rod, stow or partially stow the arm 166, move away from the rail vehicle, and/or the like. In action 238, the robotic device 120 can determine whether all of the assigned rail vehicles have been processed for the train. If not, the process can return to action 206, and the robotic device 120 can recommence the train following to process the next rail vehicle. If the train processing is complete, in action 240, the robotic device 120 can provide train processing data for use by the human user 12 and/or another computer system 14. For example, the train processing data can include data corresponding to: any minor failures, such as any failed AEI tag read operations; any incomplete actions, such as an inability to bleed the brakes of a rail vehicle; data corresponding to successful actions, such as a number of rail vehicles processed, their AEI tag data, etc.; and/or the like. Subsequently, the robotic device 120 can return to action 202 to commence another task. In an embodiment, the human user 12 can review the reported results and request that the robotic device 120 repeat one or more actions.

It is understood that the process of FIG. 5 is only illustrative and has been simplified to enable key aspects of the invention to be clearly described. For example, it is understood that the robotic device 120 can encounter various challenges and potential failure points in actions 232, 234, and 236, any one of which may require assistance and/or intervention from the human user 12. Furthermore, the various problems described herein are only illustrative of numerous problems that can be encountered by the robotic device 120. Additionally, while the process is shown as terminating when a human user 12 cannot complete an action, the human user 12 can provide further instructions, which enable the robotic device 120 to continue the process. For example, the human user 12 can instruct the robotic device 120 to skip a particular action or rail vehicle, and continue with further actions. When certain errors are encountered, the robotic device 120 can terminate the operation without requesting assistance from the human user 12. For example, one or more components of the robotic device 120 may fail to operate. In such a situation, the robotic device 120 can report the failure to the human user 12 and move to a location for servicing, if possible.

Within each of the actions described herein, it is understood that the robotic device 120 and the human user 12 can engage in a more complex, cooperative behavior. For example, while the human user 12 is assisting in operating the arm 166 to position the grasping manipulator 168, the robotic device 120 can monitor the actions requested by the human user 12 and model a result of such actions. The robotic device 120 can ensure that the requested action will not inadvertently cause damage to the robotic device 120, a rail vehicle, or other object in the vicinity, such as by overextending the arm 166, causing the robotic device 120 to collide with a rail vehicle, and/or the like. When the model predicts a potential problem, the robotic device 120 can intervene and prevent and/or adjust one or more aspects of the requested action, such as by reducing a speed of motion, diverting a direction of the movement, limiting the movement, and/or the like. The robotic device 120 can provide feedback to the human user 12 indicating why the requested action was modified, which can enable the human user 12 to evaluate the feedback and make appropriate adjustments.

The robotic device 120 can include one or more features, which further prevent the human user 12 from making a mistake while teleoperating components of the robotic device 120. For example, in order to accommodate use of a relatively slow wireless communication solution 174, the robotic device 120 can communicate image data using a progressive image compression and transmission solution, which allows the human user 12 to view the imaged scene in near real time while more details are transmitted later, e.g., through a slower speed communication link. Human commanded movement of one or more components of the robotic device 120 (e.g., the arm 166) can be implemented using a locking mechanism between discrete steps, which reduces a possibility of the human user 12 jumping ahead of the motion of the component due to a slow remote communication link 174. In an embodiment, the robotic device 120 can allow different execution speed between locked steps depending on a distance of the component from other objects in the work area. For example, the human user 12 can be allowed to move the arm 166 faster when it is some distance from the region of interest, but reduce the speed as it approaches objects located in the work area. The robotic device 120 also can determine whether performance of a requested operation can be postponed, for example, to reduce cognitive load on the human user 12 or a performance load on the robotic device 120.

It is understood that the robotic device 120 can utilize data and/or computing resources that are distributed throughout an environment. For example, referring to FIGS. 1 and 4, the computer system 21 for the robotic device 120 can include a first computing device located in the main body 160 and a second computing device located on the arm 166. During operation, the first computing device can implement a process for navigating the robotic device 120, e.g., from one rail vehicle to the next, while the second computing device can implement a process for recognizing the brake rod, moving the arm 166, and operating the grasping manipulator 168 to perform the brake bleeding operation described herein.

Additionally, one or more operations described herein as being performed by the robotic device 120 can be performed by a computer system 14 located external from the physical structure of the robotic device 120. For example, the computer system 14 can serve as a decision making/data collection source. In this case, the computer system 14 can be located in a fixed location and include one or more sensing devices, which enable the computer system 14 to acquire data on a passing train. The computer system 14 can process the data, and communicate the data and/or corresponding instructions to the robotic device 120 and/or human user 12. In this manner, the computer system 14 can schedule operations for one or more robotic devices 120 in a dynamic manner while reducing the workload for the human user 12. Additionally, the computer system 14 can acquire data for use by the robotic device 120 and/or human user 12. For example, the computer system 14 can include an imaging device, which acquires image data of the train that is processed by the computer system 14 to identify the location of a spring box and/or brake rod on each rail vehicle. The identified location(s) can subsequently be provided for use by the robotic device 120 as a precise location in a limited coordinate system. Should the computer system 14 fail to identify either the spring box or brake rod, the computer system 14 can inform the human user 12, who can attempt to identify the component(s), e.g., when the robotic device 120 is at the rail vehicle, alter instructions for the robotic device 120, and/or the like. To this extent, the human user 12 and computer system 14 can act as a single entity (e.g., as a hierarchal or star architecture) to provide instructions to and assist in the operation of the robotic device 120.

Similarly, task data 38 can be stored local to each computing device in the computer system 21 and/or stored external from the physical structure of the robotic device 120. For example, the robotic device 120 can use a wireless communication solution 174 to provide and/or obtain task data 38 to/from the computer system 14, which includes a central database that stores task data 38 for multiple robotic devices 120. By sharing task data 38, multiple robotic devices 120 can work in conjunction with one another to dynamically adjust workloads, learn from the actions of other robotic devices 120 and/or the human assistance provided to other robotic devices 120, etc.

In an embodiment, the robotic device 120 can be configured to provide task data 38 for storage in the central database after each instance of receiving human assistance. The task data 38 can include information corresponding to how the human user 12 resolved a problem or attempted to resolve a problem but failed. Periodically, each robotic device 120 can acquire new task data 38 from the central database, which can be used to improve its own autonomic operation, thereby reducing a number of instances that human user(s) 12 is (are) required to resolve same or similar problems encountered by the robotic devices 120. Furthermore, the task data 38 can enable a robotic device 120 to be able to identify when a problem will not be able to be resolved with human assistance, thereby allowing the robotic device 120 to automatically abort a task or take another appropriate action.

In an embodiment, multiple robotic devices 120 operate as a team to perform a task. For example, an environment 10 can include multiple robotic devices 20 positioned with respect to a product line. The robotic devices 20 can include a subset of primary robotic devices 20 assigned to perform a task or a series of actions of a task, and a subset of secondary robotic devices 20, which perform any actions/tasks not performed by the subset of primary robotic devices 20. For example, a primary robotic device 20 may require assistance from a human user 12 to complete an action, which may result in one or more other actions not being completed. The primary robotic device 20 can communicate this to the secondary robotic device 20 which completes the action(s). Using the robotic device 120 as another example, two robotic devices 120 can be located on opposing sides of the train and communicate with one another to complete the brake bleeding operations. For example, a robotic device 120 may not be able to pull a brake bleed lever from its side of the train (e.g., due to an obstruction or the like). In this case, the robotic device 120 can request that the robotic device 120 on the opposing side attempt to bleed the brakes.

It is understood that management of a set of robotic devices 20, 120 can be integrated into an existing process management system for an environment 10. For example, a facility may have an existing scheduling system with information regarding upcoming work, locations of the work, and/or the like. To this extent, a rail yard may include a computer system 14 with a schedule of train arrivals and departures, tracks to be utilized for trains and consists, known maintenance work to be performed, and/or the like. A robotic device 20, 120 can receive data corresponding to the schedule and its assigned tasks and pre-locate itself in an appropriate position, provide the computer system 14 with updated information regarding the operating condition of a rail vehicle, and/or the like.

As described herein, aspects of the invention can provide one or more advantages over prior art approaches. These advantages include: providing a graceful transition in both directions between full autonomy of the robotic device and full control by a human user; enabling the robotic device to assess an amount and urgency of the required assistance and to prioritize these requests for presentation to the human user; enabling the human and robotic device to work cooperatively in a seamless manner by passing instructions and data back and forth; dynamic learning from the human user by the robotic device to reduce future requests; active assistance of the human user by the robotic device to reduce errors; and/or the like.

While shown and described herein as a method and system for augmenting robotic work with human input and assistance, it is understood that aspects of the invention further provide various alternative embodiments. For example, in one embodiment, the invention provides a computer program fixed in at least one computer-readable medium, which when executed, enables a robotic device and human user to jointly perform a task as described herein. To this extent, the computer-readable medium includes program code, such as the automation program 30 (FIG. 1), which enables a robotic device to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the automation program 30 (FIG. 1), which enables a robotic device to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for performing a task using a robotic device augmented by a human user. In this case, the generating can include configuring a computer system, such as the computer system 21 (FIG. 1), to implement a method of performing a task as described herein. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
   a robotic device including:
   a set of effector devices;
   a set of sensor devices; and
   a first computer system including at least one computing device, wherein the first computer system implements a machine cognition engine configured to perform a task on a target object using the set of effector devices, the set of sensor devices, and a hybrid control architecture including a plurality of levels of autonomy dynamically changeable by the robotic device, wherein the plurality of levels of autonomy include: full autonomy of the robotic device while performing the task, teleoperation of the robotic device by a human user to perform at least one action of the task, and at least one level of shared control between the computer system and the human user to perform at least one action of the task, wherein the robotic device initially attempts to complete the task using the full autonomy level of autonomy, and wherein the robotic device automatically increases or decreases a current level of autonomy in response to determining an ability to perform a current action of the task.

2. The system of claim 1, wherein the task includes a plurality of actions, and wherein the first computer system first attempts to perform each of the plurality of actions using the full autonomy level of autonomy.

3. The system of claim 2, wherein, in response to encountering a problem completing an action in the plurality of actions using the full autonomy level of autonomy, the first computer system determines a criticality of the action and performs one of: adjusts the level of autonomy in response to the action being a critical action or bypasses the action in response to the action being a non-critical action.

4. The system of claim 1, further comprising a second robotic device, wherein the robotic devices work in conjunction with one another to complete a set of tasks on a set of target objects.

5. The system of claim 1, further comprising a second computer system in communication with the first computer system, wherein the second computer system includes a database with task data received from a plurality of robotic devices configured to perform the task, and wherein the first computer system is configured to obtain task data from the second computer system to improve an ability of the robotic device to autonomously perform a task.

6. The system of claim 1, wherein the robotic device is a mobile device and the set of effector devices includes at least one arm including a plurality of degrees of freedom and at least one manipulator located adjacent to an end of the arm, and wherein the machine cognition engine is configured to navigate the robotic device in an operating environment to perform the task.

7. The system of claim 6, wherein the operating environment is a rail yard, and wherein the task is a brake bleeding task performed on a series of rail vehicles in a consist using the at least one manipulator.

8. A method of performing a task using a robotic device, the method comprising:
the robotic device initially attempting to complete the task on a target object using a full autonomy level of autonomy;
in response to the robotic device encountering a problem completing at least one action of the task using the full autonomy level of autonomy, the robotic device:
determining a criticality of the at least one action;
adjusting a level of autonomy in response to the at least one action being a critical action, wherein the adjusted level of autonomy includes at least some human assistance for the robotic device; and
bypassing the at least one action in response to the action being a non-critical action.

9. The method of claim 8, wherein the task includes a plurality of actions, and wherein the robotic device first attempts to perform each of the plurality of actions using the full autonomy level of autonomy.

10. The method of claim 8, the method further comprising the robotic device receiving human assistance to complete the critical action and the robotic device automatically adjusting the level of autonomy to the full autonomy level of autonomy in response to evaluating the critical action as being complete.

11. The method of claim 10, the robotic device further providing data corresponding to the human assistance to a central database accessible by a plurality of robotic devices.

12. The method of claim 8, wherein the human assistance includes teleoperation of at least one effector device on the robotic device.

13. The method of claim 12, wherein the teleoperation includes:
the robotic device receiving an action request from the human user;
the robotic device modeling a result of the requested action;
the robotic device performing the requested action in response to the modeled result indicating the requested action is safe; and
the robotic device intervening in the requested action in response to the modeled result indicating the requested action is not safe.

14. The method of claim 8, wherein the robotic device is a mobile device, and wherein the task includes navigating the robotic device in an operating environment.

15. The method of claim 14, wherein the operating environment is a rail yard, and wherein the task is a brake bleeding task on a series of rail vehicles in a consist.

16. A mobile robotic device comprising:
a set of effector devices including an arm having a plurality of degrees of freedom and a manipulator located adjacent to an end of the arm;
a set of sensor devices including at least one imaging device; and
a computer system including at least one computing device, wherein the computer system implements a machine cognition engine configured to perform a set of railroad maintenance tasks using the set of effector devices, the set of sensor devices, and a hybrid control architecture including a plurality of levels of autonomy dynamically changeable by the robotic device during performance of a task of the set of railroad maintenance tasks, wherein the plurality of levels of autonomy include: full autonomy of the robotic device while performing the task, teleoperation of the robotic device by a human user to perform at least one action of the task, and at least one level of shared control between the computer system and the human user to perform at least one action of the task, wherein the robotic device initially attempts to complete the task using the full autonomy level of autonomy, and wherein the robotic device automatically increases or decreases a current level of autonomy in response to determining an ability to perform a current action of the task.

17. The robotic device of claim 16, wherein the at least one imaging device includes:
a first imaging device located on a main body of the robotic device; and
a second imaging device located adjacent to the manipulator, wherein the computer system processes image data for the second imaging device to operate the arm and the manipulator.

18. The robotic device of claim 16, wherein the set of railroad maintenance tasks includes a brake bleeding task on a rail vehicle using the arm and the manipulator.

19. The robotic device of claim 16, wherein, in response to encountering a problem completing an action for a task using the full autonomy level of autonomy, the computer system determines a criticality of the action and performs one of: adjusts the level of autonomy in response to the action being a critical action or bypasses the action in response to the action being a non-critical action.

20. The robotic device of claim 16, wherein the computer system is further configured to provide task data corresponding to completion of an action for the task using human assistance for storage at a central database and obtain external task data corresponding to completion of an action for a task by another robotic device using human assistance from the central database and process the external task data to improve an ability of the robotic device to autonomously perform the action.

\* \* \* \* \*